United States Patent [19]

Burger

[11] Patent Number: 4,561,193
[45] Date of Patent: Dec. 31, 1985

[54] NOZZLE ARRANGEMENT FOR A VEHICLE DRYING INSTALLATION

[76] Inventor: Horst Burger, Gartenstrasse 6 d, D-8902 Neusass, Fed. Rep. of Germany

[21] Appl. No.: 671,337
[22] Filed: Nov. 14, 1984
[30] Foreign Application Priority Data
  Nov. 24, 1983 [DE] Fed. Rep. of Germany ... 8333776[U]
[51] Int. Cl.$^4$ .................................. F26B 15/12
[52] U.S. Cl. .................................. 34/54; 34/229; 34/243 C; 15/316 R; 239/548
[58] Field of Search .............. 34/243 C, 243 R, 229, 34/54; 15/302, 306 R, 316 R; 239/557, 552, 562, 548

[56] References Cited

U.S. PATENT DOCUMENTS 2,663,951 12/1953 Kennison .................. 34/243 C
3,583,686 6/1971 Mackey .................... 34/243 C
3,808,703 5/1974 Kamiya .................... 34/243 C Primary Examiner—Larry I. Schwartz
Attorney, Agent, or Firm—Cushman, Darby & Cushman

[57] ABSTRACT

A nozzle arrangement for a vehicle drying installation of the type wherein blown air is utilized to dry a vehicle surface. A triangular grouping of plural openings is provided such that each opening includes a rigid flange member dependently associated therewith. The flange members by virtue of the triangular grouping of openings establishes a general V-shaped blown air curtain profile which impinges upon a surface of the vehicle such that relative movement between the vehicle and the V-shaped air curtain profile along a travel path responsively effects blown movement of water upon the vehicle surface both rearwardly and laterally relative to the travel path to effectively dry the vehicle surface.

21 Claims, 9 Drawing Figures

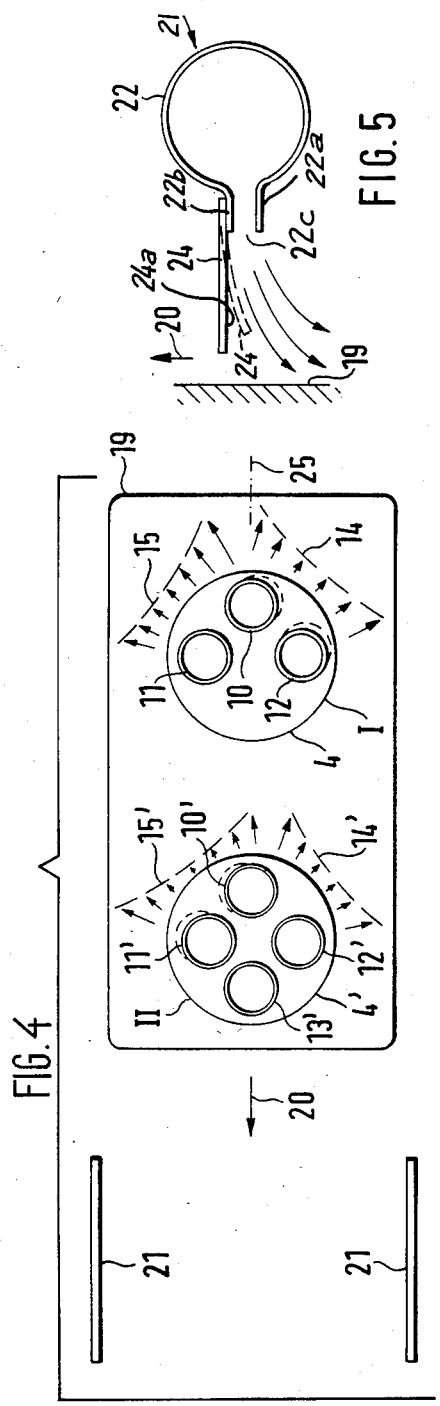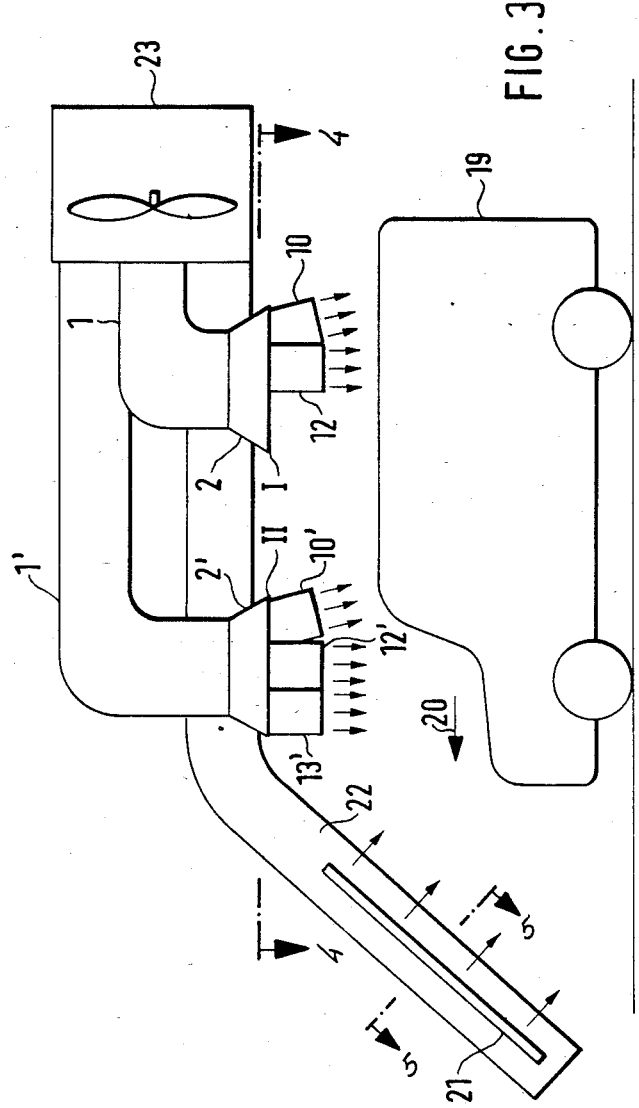

NOZZLE ARRANGEMENT FOR A VEHICLE DRYING INSTALLATION

BACKGROUND AND SUMMARY OF THE INVENTION

The present invention relates to a nozzle arrangement for drying installation particularly well suited to dry motor vehicles. In accordance with the present invention. A triangular grouping of plural openings establishes a general V-shaped air curtain which impinges upon a surface of a vehicle to be dried. Upon relative movement between the vehicle and the triangular grouping of openings, water upon the vehicle surface will be blown both rearwardly and laterally relative to the travel path. Preferably, the air curtain is produced by a common blower.

In the case of motor vehicle washing installation, drying devices are used so as to blow or sweep water from the surface of the vehicle by means of directional jets of air. The use of nozzle arrangements for such a purpose is generally known wherein a pipe of circular cross section is transformed into a horizontal elongated nozzle opening. This elongated, horizontal nozzle opening is disposed in most situations transversely to the longitudinal axis of the vehicle or to the vehicle's direction of movement through the drying device. It has also been known, however, to orient such an elongated nozzle opening parallel to the direction of the longitudinal axis of the vehicle.

Such a nozzle arrangement is relatively expensive, since the circular cross-sectional feed pipe for the air must be reshaped by transition members into an elongated nozzle opening. Another disadvantage of such a conventional arrangement resides in the fact that the elongated air jet at its terminal end areas is highly turbulent and thus the air jet splits up at a relatively small distance in relation to the nozzle opening thereby effectively contacting only a small part of the surface of the vehicle while the lateral areas of the surface of the vehicle are at most minimally influenced by the air jet. Thus, such an arrangement is distinctly disadvantageous for vehicles having a large transverse width.

Furthermore, an arrangement of an elongated nozzle opening is known which is disposed transversely to the longitudinal axis of the vehicle. Two air conducting pipes terminate at the opening for the purpose of evenly distributing the longitudinal air jet over the entire length of the nozzle. In order to intensify the drying effect, the nozzle arrangement is suspended for oscillatory movement whereby the reversal of the terminal positions of the oscillatory movement is achieved by means of light barriers or electric position switches. While the oscillatory movement causes the weak elongated air jet to blow the water more evenly from the surface of the vehicle, the structure required is of expensive construction and is subject to breakdowns while exposing operators to potential accident risks. The drying effect is not altogether satisfactory, since the air jet is divided at a relatively slight distance from the nozzle opening and thus fails to effectively impinge upon the surface of the vehicle.

An elongated air distribution box is also known which is disposed transversely to the longitudinal axis of the vehicle and from which three pipe sockets which are linearly disposed in a side-by-side fashion are directed downwardly. Such a structure is disadvantageous since "dead spots" are established between the middle and the two adjacent lateral air jets. Thus, the water on that portion of the surface of the vehicle exposed to the dead spots is not forcibly removed therefrom and as a result, two streaks of water running in longitudinal direction on the surface of the vehicle corresponding to the dead spots are formed.

The present invention remedies the above-discussed disadvantages of by providing a nozzle arrangement which effects a strong flow of air impinging upon a surface of the vehicle such that a general V-shaped air curtain profile is established so as to simultaneously sweep or blow water from the vehicle's surface both rearwardly and laterally relative to the vehicle's direction of travel. To accomplish such functions, the present invention includes a triangular grouping of apertures, the apex of which is positioned so as to be upstream of the other apertures in the grouping. Air discharged from the aperture grouping thus assumes a general V-shaped profile such that the water on the surface of the vehicle is forcibly blown both rearwardly and laterally relative to the direction of travel of the vehicle.

Removal of water from the side surfaces of the vehicle is accomplished according to the present invention by providing a pair of lateral nozzle arrangements which direct air flow onto the vehicle's side surfaces such that the water thereon is forcibly blown both downwardly and rearwardly relative to the vehicle's path of conveyance. Thus, the lateral nozzle arrangements establish lateral air curtains which are downwardly angularly oriented in the direction the vehicle's conveyance.

The above advantages as well as others will become more clear to the reader after careful consideration is given to the description of the preferred exemplary embodiments thereof which follow.

BRIEF DESCRIPTION OF THE ACCOMPANYING DRAWINGS

Reference will hereinafter be made to the accompanying drawings wherein like reference numerals throughout the various figures denote like structural elements and wherein:

FIG. 3 is a schematic side elevational view of a drying installation for vehicles using the nozzle arrangement of the present invention;

FIG. 4 is a plan view of the vehicle drying installation taken along line IV—IV in FIG. 3;

FIG. 5 is a cross-sectional view of a lateral nozzle arrangement of the present invention taken along line V—V in FIG. 3;

DETAILED DESCRIPTION OF THE PREFERRED EXEMPLARY EMBODIMENT

Figure 1:
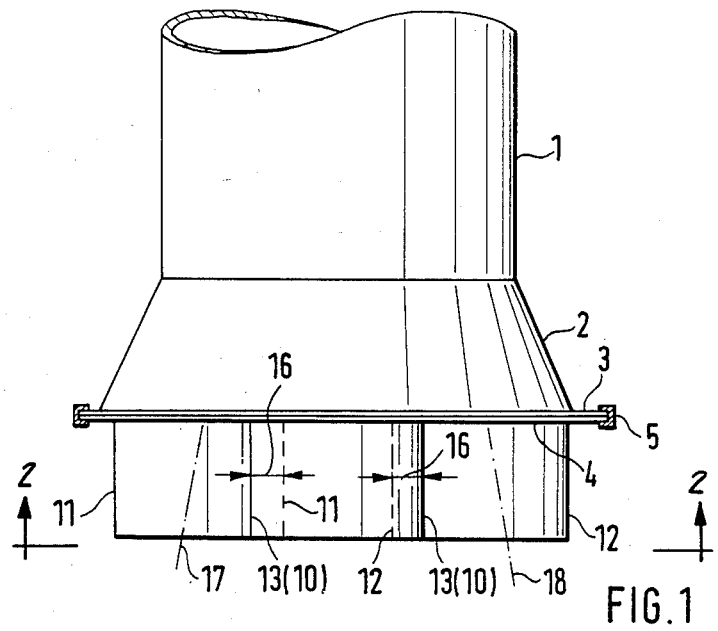
FIG. 1 shows a side view of the nozzle arrangement of the present invention.
Figure 2:
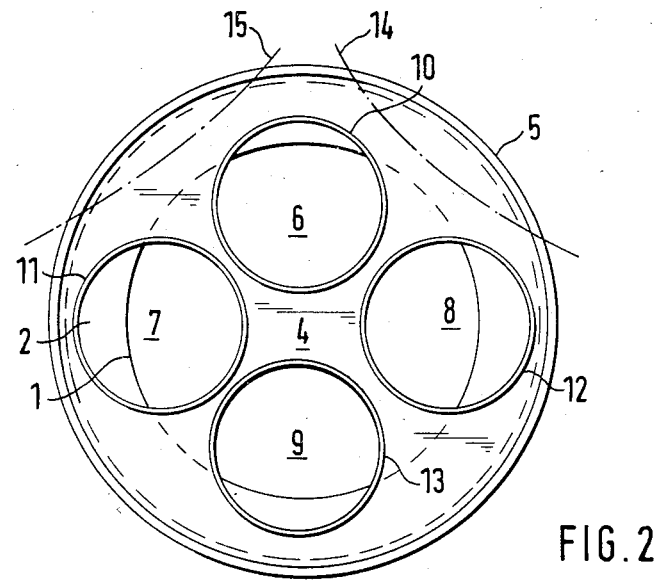
FIG. 2 shows a bottom plan view taken along line II—II in FIG. 1.

As shown in FIGS. 1 and 2, the air conducting pipe 1 preferably is circular in cross section and includes an enlarged conical section 2 at the bottom of pipe 1. An annular flange 3 is provided at the lower end of the conical section 2. The underside of the conical section 2 of the air conducting pipe 1 is closed by means of a plate 4 which has an outside diameter corresponding to that of the annular flange 3. The plate 4 is connected to the annular flange 3 by way of a schematically-shown tightening strap 5.

Plate 4 defines plural openings 6, 7, 8, 9 having rigid flanges 10, 11, 12, 13 communicating with a respective one of the openings and directed downwardly therefrom. The openings 6-9 and the flanges 10-13 preferably have a circular cross-section such that the combined cross sectional area of the openings 6-9 corresponds approximately to the cross-sectional area of the air conducting pipe 1.

The triangular arrangement of flanges 10 to 13 of the present invention ensures that the air jets issuing therefrom are still effective at a considerable distance from the lower openings of the flanges. Furthermore, the triangular grouping of flanges 10-13 will together establish a monolithic general V-shaped air curtain profile so that the curtain acts in the manner of a "snowplow" on the surface of the vehicle as a result of which the water on the surface of the vehicle is forced off both rearwardly and laterally. The snowplow-like cooperation and effect of the air jets issuing from the flanges 10, 11 and 12 is shown by the dash dot lines 14, 15 in FIG. 2.

It is significant therefore that at least three openings 6, 7, 8 be provided with their associated flanges 10, 11, 12 such that flanges 10-12 are disposed in a triangular grouping relative to one another. In such a preferred arrangement, the opening 6 with its associated flange 10 forms the forward nozzle opening or apex of the triangular grouping viewed in the direction of relative movement between the nozzle arrangement and the surface of the vehicle.

Moreover, the arrangement preferably should be made such that when viewed in elevation, the forwardmost flange (e.g. flange 10 as shown in FIG. 1) at least partially blinds immediately adjacent rearward flanges (e.g. flanges 11 and 12 as show in in FIG. 1). The amount of partial blinding is designated in FIG. 1 by reference numeral 16. Due to this partial blinding, disadvantageous "dead spots" of air flow are effectively eliminated and thus a monolithic substantially even-strength air curtain is established.

Preferably, the flanges 10 to 13 are directed perpendicularly downwards but it is also possible for flanges 10 to 13 to diverge slightly relative to one another as indicated by the axes 17, 18 of the flanges 11, 12 in FIG. 1. Openings 6 to 9 are preferably equal in diameter but it is also possible, for example, to provide an enlarged opening 6 with its associated flange 10 relative to the remaining openings 7 to 9 and flanges 11 to 13, respectively. The length of the flanges 10 to 13 is such that even at a considerable distance, the air currents issuing therefrom are not essentially divided up. That is, flanges 10 to 13 concentrate the air flow therethrough such that dissipation of the V-shaped air curtain profile is prevented at a considerable distance therefrom.

FIGS. 3 and 4 show the application of the nozzle arrangement according to FIGS. 1 and 2 in a vehicle drying installation in which relatively large vehicles are to be dried. In the case of smaller vehicles as are customary in Europe, a single nozzle arrangement according to FIGS. 1 and 2 is typically sufficient. In the case of the vehicle drying installation, a first nozzle arrangement I and a second nozzle arrangement II are provided and are disposed one behind the other relative to the direction of the longitudinal axis 25 of the vehicle 19. Vehicle 19 is moved in the direction of arrow 20 under the nozzle arrangements I and II either under its own power or by means not shown.

The air conducting pipe 1, 1' of the nozzle arrangements I and II and the air conducting pipes 22 for the lateral nozzles may be connected for fluid communication with a common blower 23.

The first nozzle arrangement I includes three flanges 10, 11, 12, while the second nozzle arrangement includes four flanges 10', 11', 12', 13'. The lateral flange 11 is preferably disposed perpendicularly while, on the other hand, the forward flange 10 is inclined forwardly to the left when viewed in the direction of the arrow 20 while the lateral pipe socket 20 is inclined to the left. As a result the strength of the V-shaped air curtain is biased to the left such that when the air curtain strikes the surface of the vehicle 10, the water located on it is driven off more strongly to the left than to the right, as is illustrated by the lines 14, 15 in FIG. 3.

In the case of the second nozzle arrangement II, the conditions are preferably the reverse to those described above with regard to nozzle arrangement I. That is, the lateral flange 12' which is located on the opposite side of the longitudinal axis 25 of the vehicle is directed perpendicularly downwards. The forward flange 10' is inclined rearwardly and to the right relative to travel direction 20 while the lateral flange 11' is inclined to the right. The rear flange 13' is preferably directed perpendicularly downwards. The V-shaped air curtain emanating from the flanges 10' to 13' thus encourage the water on the surface of the vehicle 19 to be swept more strongly to the right as indicated by the lines 14', 15' in FIG. 3. As a result nozzle arrangement I sweeps the water from the left half of the vehicle surface while the nozzle arrangement II sweeps the water from the right half of the vehicle surface.

After traveling downstream of the nozzle arrangements I and II, the vehicle 19 is exposed to an area defined between two lateral nozzles 21 which sweep the water remaining on the lateral surfaces of the vehicle downwardly and rearwardly relative to direction 20. The lateral nozzles 21 are disposed transversely and inclined forwardly of the direction of travel 20 of vehicle 19 as shown in FIG. 4. Therefore, vehicle 19 is exposed to the upper portion of the nozzles 21 as it moves in the direction arrow 20.

As shown in FIG. 5, the lateral nozzles 21 include a pipe 22 having a pair of laterally spaced apart parallel lip members 22a, 22b which establish therebetween a slot 22c through which air is discharged. A flexible skirt 24 is attached to the downstream lip member 22b so as to cause the air discharged from slot 22c to be deflected rearwardly relative to the direction 20 of vehicle 19. That is, air flowing along the upstream surface 24a of skirt 24 will cause a reduced area of pressure to be developed therealong. Skirt 24 will thus be flexibly deflected rearwardly relative to the direction of travel 20 of vehicle 19 to thereby responsively cause air discharged through slot 22c to be similarly rearwardly deflected.

Figure 7:
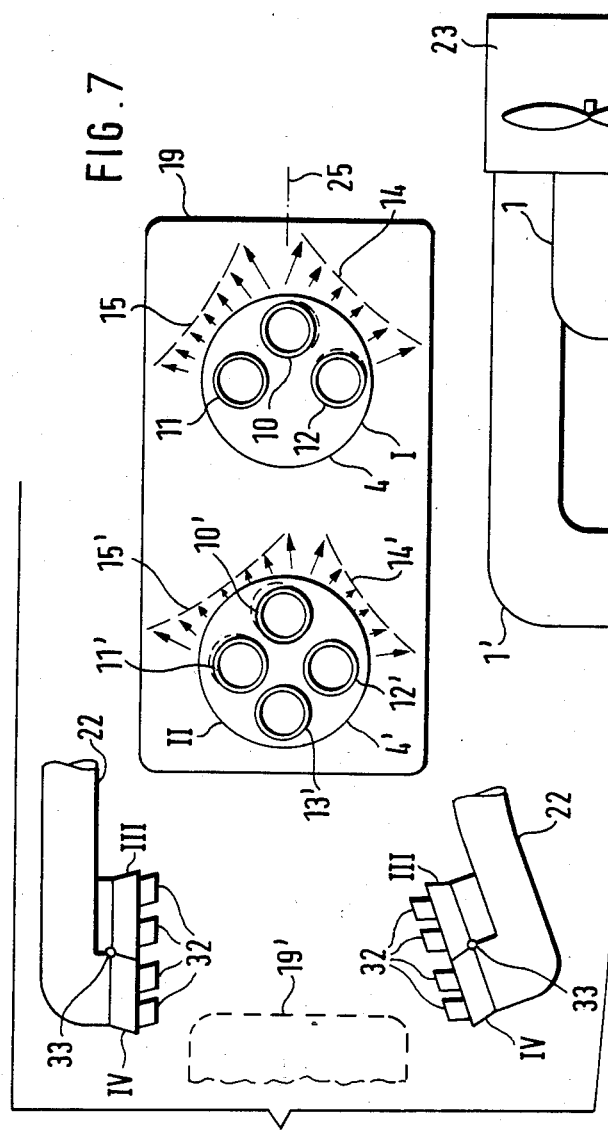
FIG. 7 is a plan view of the vehicle drying installation taken along line VII—VII in FIG. 6.
Figure 6:
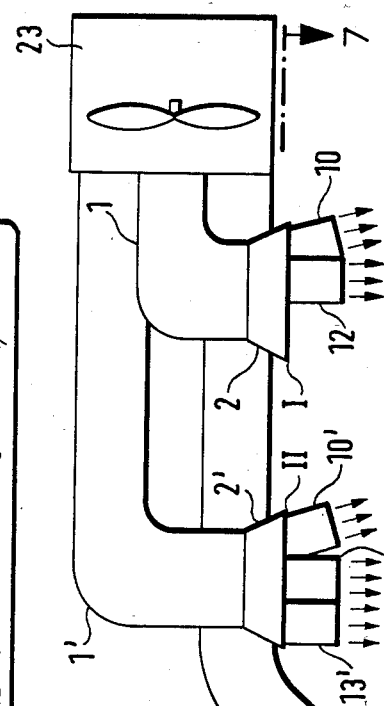
FIG. 6 is a schematic side elevational view of another embodiment of a vehicle drying installation of the present invention.
Figure 8:
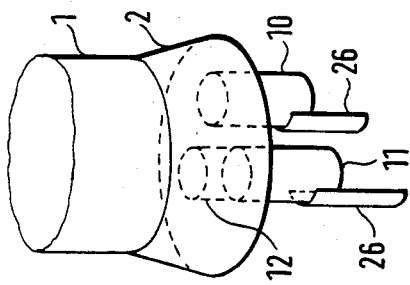
FIG. 8 depicts a variation of the embodiment of the nozzle arrangement according to FIGS. 1 and 2.

The vehicle drying installation according to the embodiment of the invention shown in FIGS. 6 and 7 is similar to the embodiment of FIGS. 3 and 4 with the exception that the slotted lateral nozzles 21 are replaced by nozzle arrangements III and IV. Arrangements III and IV are similar to the nozzle arrangements I and II described previously with the primary difference being that each nozzle arrangement III and IV includes two flanges 32 spaced equidistantly from one another and disposed along a straight line which extends from above in the direction of the arrow 20 transversely downwardly. The individual flange 32 in this embodiment are preferably directed counter to the direction of the arrow 20 and are slanted downwardly.

According to the embodiment of FIGS. 6 and 7, the streams of air discharged from the flange 32 sweep the lateral surfaces of the vehicle 19 to thus establish an air curtain at the lateral side surface of the vehicle 19 as designated schematically in FIG. 7 by reference numeral 34 when the lateral surfaces of vehicle 19 are located in the operative area of the nozzle arrangements III and IV.

In order that the rear side of the vehicle 19 will also be effectively dried, the nozzle arrangements III and IV are mounted so as to be swiveled around an axle 33. The nozzle arrangements III and IV shown on the lower half of FIG. 6 are depicted as having been swiveled around horizontal axel 33 when the vehicle 19 assumes the position 19'. When the vehicle proceeds beyond the operative area of the lateral nozzle arrangements, they are then swiveled back into their normal position which is shown in the upper portion of FIG. 6. Swiveling movement around axel 33 may be controlled, for example, by light barriers (not shown) which intercept the passage of the vehicle 19 in the direction of the arrow 20. To permit the nozzle arrangements III and IV to be swivelable around axle 33, pipe 22 must be in the form of a flexible conduit to permit bending thereof in response to swiveling of nozzle arrangements III and IV.

The air current 34 which is established by the lateral nozzles 21 whenever the lateral walls of the vehicle are located in the operative area of either lateral nozzles 21 or of the nozzle arrangements III and IV, causes water remaining on the lateral walls to be swept slantingly downwardly relative to direction 20. The same effect results with regard to the rear side of the vehicle 19. When in the position 19' whenever the nozzle arrangements III and IV are swiveled so that air is directed onto the rear side of the vehicle due to the rear side being first intercepted by the air stream of the uppermost one of the flanges 32 and then increasingly by the further air streams discharged from the lower flanges 32.

Whenever a still more distinct directional output of the combined air curtains 14, 15 or 34 is to be achieved from the pipe sockets 10 to 13 and/or 32, respectively, in order to be able for example to optimally dry even very small cars, flexible skirts 26 can be attached to the flanges 10 to 13 or 32. Skirts 26 are preferably attached to the exterior downstream portion of flanges 10 to 13 and/or flanges 32 and dependently extend therefrom such that skirts 26 assume an arcuate cross-sectional shape conforming to the arcuate cross-sectional shape of flanges 10 to 13 and/or flanges 32. In a manner similar to that described above with respect to skirt 24, as air discharged from flanges 10 to 13 and/or 32 flows along the upstream surface of skirts 26, a reduced pressure area therealong will be established thereby causing skirts 26 to be flexibly deflected rearwardly relative to the direction of travel 20 of vehicle 19. Thus, air discharged from flanges 10 to 13 and/or 32 will be responsively rearwardly deflected due to the flexible rearward deflection of skirts 26 respectively attached thereto.

The full air output of the blower 23 is needed only whenever a vehicle passes through the drying installation. In the pauses between the passage of two consecutive vehicles the blower 23 could therefore be shut down. However, shut down of the blower is disadvantageous since increased electrical power is consumed when the blower is reactivated. In order to reduce the blower output between two passages of vehicles, a solution to the above disadvantage is proposed in accordance with the present invention so as to reduce the blower output between passage of consecutive vehicles as will be explained with reference to FIG. 9. Thus, power consumption of the blower 23 greatly decreases between passage of consecutive vehicles in accordance with this embodiment of the invention.

The blower 23 includes a fan 28 which is drivenly rotated by an electric motor 27. A first air conducting wheel 30 is positioned upstream of fan 28 while a second air conducting wheel 29 is positioned downstream of fan 28. The air conducting wheel 30 effectively causes the air flowing into the blower 23 to assume a turbulent or a multiple axis flow pattern while the stationary second air conducting wheel 29 effectively removes the turbulent or multi-axis flow patterns caused by air conducting wheel 30 and fan 28 so that the air flow downstream thereof assumes a substantial unidirectional flow pattern upon its entry into pipes 1, 22.

Figure 9:
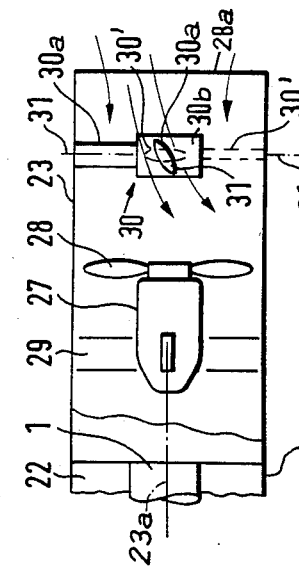
FIG. 9 shows a schematic cross-sectional view of a blower for use in a vehicle drying installation of the present invention.

The wings 30a (only two of which are shown in FIG. 9 for clarity of presentation) of the upstream air conducting wheel 30 are radially coupled to hub 30b in a star-shaped arrangement so that each is capable of rotation around their respective axis 31. In the normal state of operation, that is to say in the situation where full output of the blower is desired, wings 30a are slantingly disposed relative to the longitudinal axis 23a of the blower 23 as shown in solid lines in FIG. 9. In the time interval between the successive passage of vehicles, the wings 30a are rotated around their respective axes 31 in such a way that the entry opening 28a to the fan 28 is effectively reduced. This position is indicated by the dashed lines 30' in FIG. 9. The fan 28 is thus required to only convey a small quantity of air flow as a result of which the power consumption of the motor 27 is reduced due to the reduced rotation of the motor. As soon as a vehicle 19 approaches the drying installation, the wings 30a of the forward air conducting wheel 30 are again pivoted into their normal positions as a result of which the blower 23 again produces the full output of air flow. Pivoting of wings 30a can be accomplished by any means known to those in the control art. For example, an electric eye can be utilized to sense the relative positioning of the vehicle such that motors connected to the wings 30a will cause wings 30a to pivot to either restore full air flow or reduce air flow to ducts 1 and 22 upon the sensed position of the vehicle.

While the present invention has herein been described in terms of the most preferred embodiments thereof, those in this art may recognize that many modifications may be made thereto, which modifications shall be accorded the broadest scope of the appended claims so as to encompass all equivalent structures and/or assemblies.

What is claimed is:

1. A nozzle arrangement for a vehicle drying installation of the type including conduit means for defining a path through which blown air travels and blower means operatively connected to said conduit means at one end thereof for blowing air through said conduit means from said one end to a discharge end thereof, said nozzle arrangement including opening-defining means defining a triangular grouping of plural openings communicable with said discharge end of said conduit means to permit said blown air to pass therethrough, and plural flange means rigidly associated with respective ones of said openings to direct said blown air onto a surface of the vehicle, said flange means by virtue of said triangular grouping of openings for establishing a generally V-shaped blown air curtain profile for impingement upon said vehicle surface such that relative movement between said vehicle and said blown air curtain profile along a predetermined direction of travel responsively effects blown movement of water upon said surface rearwardly and laterally relative to said direction of travel, wherein said opening-defining means includes a truncated conically-shaped transition member having a top circular opening fixable to said discharge end of said conduit means and a bottom opening, plate means fixed to said bottom opening and defining at least three circular openings therein, said at least three circular openings establishing said triangular grouping, wherein the total area of said at least three circular openings is substantially equal to the area of said top opening.

2. A nozzle arrangement as in claim 1 further including air deflection means fixed to and dependently supported from a downstream portion, relative to said direction of travel, of predetermined ones of said flange means, said air deflection means for deflecting air discharged from said predetermined ones of said skirt means in an upstream direction due to flexion of said skirt means in response to reduced pressure being established along said upstream surface by air flowing thereagainst.

3. Nozzle arrangement as in claim 1 further including means defining a fourth opening communicable with said conduit means and wherein one of said plural flange means is rigidly associated with said fourth opening, said fourth opening being disposed downstream, relative to said direction of travel, of said triangular grouping in alignment with an upstream-most one of said first-mentioned opening so as to establish, together with said triangular grouping, a quadrangularly-shaped grouping of openings.

4. A nozzle arrangement as in claim 1 wherein said flange means of an upstream-most one of said at least three openings is sized and configured such that the remaining ones of said flange means of said at least three apertures are at least partially hidden by said flange means of said upstream-most one when viewed in said direction of travel.

5. A vehicle drying installation for drying a vehicle as said vehicle moves along a predetermined direction of travel comprising:
conduit means having inlet and discharge ends for defining therebetween a path through which blown air passes;
blower means connected to said inlet end of said conduit means for blowing air through said conduit means along said path;
at least one primary nozzle means fixed to said discharge end of said conduit means for discharging air therefrom in a direction impinging upon a surface of said vehicle, said nozzle means including means defining a triangular grouping of plural openings in fluid communication with said conduit means and plural flange means rigidly associated with respect ones of said openings to direct blown air onto said vehicle surface, said flange means by virtue of said triangular grouping of openings for establishing a generally V-shaped blown air curtain profile impinging upon said vehicle surface such that relative movement between said vehicle and said blown air curtain profile along said travel direction responsively effects blown movement of water upon said surface rearwardly and laterally relative to said travel direction whereby said vehicle surface is substantially dried, and
a pair of lateral nozzle means in fluid communication with said blower means, said pair of lateral nozzle means defining therebetween a space through which the vehicle passes, each lateral nozzle means for discharging air in an impinging direction upon a respective lateral side surface of said vehicle, wherein each said lateral nozzle means includes discharge means defining an angularly oriented discharge path for discharging blown air in an impinging direction upon said respective vehicle side surfaces to establish an angularly oriented lateral blown air curtain such that relative movement between said vehicle and said lateral blown air curtain responsively effects blown movement of water on said respective vehicle side surfaces downwardly and rearwardly relative to said travel direction, and wherein
said discharge means includes air deflection means defining an upstream surface relative to said travel direction in contact with said air discharged from said discharge means, said air deflection means for deflecting said discharged air in an upstream direction relative to said travel direction due to flexion of said deflection means in response to reduced pressure being established along said upstream surface by air discharged from said discharge means.

6. Vehicle drying installation as in claim 5 further comprising:
second conduit means having an inlet end and a discharge end for defining therebetween a second path through which blown air passes, said inlet end of said conduit means connected to said blower means so that said blower means blows air through said second conduit means along said second path; and
second nozzle means fixed to said discharge end of said second conduit means and disposed downstream of said at least one nozzle means relative to said travel direction, said second nozzle means for discharging air therefrom in a direction impinging upon a surface of said vehicle, said second nozzle means including means defining a second triangular grouping of plural second openings in fluid communication with said second conduit means and second plural flange means rigidly associated with respective ones of said second openings to direct blown air onto said vehicle surface, said second flange means by virtue of said second triangular grouping of second openings for establishing a second generally V-shaped blown air curtain profile impinging upon said vehicle surface downstream of said first-mentioned V-shaped blown air curtain such that relative movement between said vehicle and said second blown air curtain profile along said travel direction responsively effects blown movement of water upon said surface rearwardly and laterally relative to said travel direction whereby said vehicle surface is substantially dried.

7. Vehicle drying installation as in claim 6 wherein predetermined ones of said first-mentioned flange means are angularly oriented towards one lateral side of said vehicle to cause a major component of said first-mentioned generally V-shaped blown air curtain to be directed towards said one vehicle side, and wherein predetermined ones of said second flange means are angularly oriented relative to another lateral side of said vehicle to cause a major component of said second generally V-shaped blown air curtain to be directed towards said other side.

8. Vehicle drying installation as in claim 5 wherein said pair of lateral nozzle means are located downstream of said at least one primary nozzle means.

9. Vehicle drying installation as in claim 5 wherein said discharge means defines an elongated slot.

10. Vehicle drying installation as in claim 9 wherein said discharge means includes a pair of spaced-apart parallel lip members establishing therebetween said elongated slot.

11. A vehicle drying installation for drying a vehicle as said vehicle moves along a predetermined direction of travel comprising:
conduit means having inlet and discharge ends for defining therebetween a path through which blown air passes;
blower means connected to said inlet end of said conduit means for blowing air through said conduit means along said path;
at least one primary nozzle means fixed to said discharge end of said conduit means for discharging air therefrom in a direction impinging upon a surface of said vehicle, said nozzle means including means defining a triangular grouping of plural openings in fluid communication with said conduit means and plural flange means rigidly associated with respective ones of said openings to direct blown air onto said vehicle surface, said flange means by virtue of said triangular grouping of openings for establishing a generally V-shaped blown air curtain profile impinging upon said vehicle surface such that relative movement between said vehicle and said blown air curtain profile along said travel direction responsively effects blown movement of water upon said surface rearwardly and laterally relative to said travel direction whereby said vehicle surface is substantially dried, and
a pair of lateral nozzle means in fluid communication with said blower means, said pair of lateral nozzle means defining therebetween a space through which the vehicle passes each for discharging air in an impinging direction upon a respective lateral side surface of said vehicle, each said lateral nozzle means including discharge means defining an elongated slot establishing an angularly oriented discharge path for discharging blown air in an impinging direction upon said respective vehicle side surfaces to establish an angularly oriented lateral blown air curtain such that relative movement between said vehicle and said lateral blown air curtain responsively effects blown movement of water on said respective vehicle side surfaces downwardly and rearwardly relative to said travel direction, wherein
said discharge means includes a pair of spaced-apart parallel lip members establishing therebetween said elongated slot, and wherein
a downstream one of said lip members includes flexible air deflection means extending towards said respective side surface and having an upstream surface in contact with air discharged from said elongated slot, said air deflection means for deflecting air discharged from said slot in an upstream direction relative to said travel direction due to flexion of said deflection means in response to reduced pressure being established along said upstream surface by air discharged from said slot.

12. Vehicle drying installation as in claim 5 or 11 wherein said discharge means includes first and second means each defining plural circular openings, said second means disposed downstream of and below said first means to thereby establish said angularly oriented discharge path.

13. Vehicle drying installation as in claim 11 wherein said first and second means are oriented rearwardly and downwardly relative to said travel path.

14. Vehicle drying apparatus as in claim 12 wherein said first and second means includes means to mount said first and second means for pivotal movement about an axis to permit blown air discharged therein to be directed against a rear surface of said vehicle.

15. A vehicle drying installation for drying a vehicle as said vehicle moves along a predetermined direction of travel comprising:
conduit means having inlet and discharge ends for defining therebetween a path through which blown air passes;
blower means connected to said inlet end of said conduit means for blowing air through said conduit means along said path; and
at least one primary nozzle means fixed to said discharge end of said conduit means for discharging air therefrom in a direction impinging upon a surface of said vehicle, said nozzle means including means defining a triangular grouping of plural openings in fluid communication with said conduit means and plural flange means rigidly associated with respective ones of said openings to direct blown air onto said vehicle surface, said flange means by virtue of said triangular grouping of openings for establishing a generally V-shaped blown air curtain profile impinging upon said vehicle surface such that relative movement between said vehicle and said blown air curtain profile along said travel direction responsively effects blown movement of water upon said surface rearwardly and laterally relative to said travel direction whereby said vehicle surface is substantially dried, wherein said blower means comprises;
(i) housing means having inlet and outlet openings and defining an interior space;
(ii) fan means disposed in said interior space to draw air in through said inlet opening and to blow air through said outlet opening; and
(iii) means for reducing air flow through said inlet opening to thus reduce power consumption of said fan means during periods in which a vehicle is not present in said drying installation including (a) a hub fixed upstream of said fan means in said housing means, and (b) plural vanes radially extending from said hub and pivotally mounted thereto, each said plural vane pivotal to an open position to permit full air flow to be drawn into said housing means through said inlet opening by said fan means when a vehicle is present in said drying installation and pivotal to a closed position to reduce the flow of air into said housing through said inlet opening by said fan means when a vehicle is not present in said drying installation.

16. Vehicle drying installation as in claim 11 or 15 further comprising:

second conduit means having an inlet end and a discharge end for defining therebetween a second path through which blown air passes, said inlet end of said conduit means connected to said blower means so that said blower means blows air through said second conduit means along said second path; and second nozzle means fixed to said discharge end of said second conduit means and disposed downstream of said at least one nozzle means relative to said travel direction, said second nozzle means for discharging air therefrom in a direction impinging upon a surface of said vehicle, said second nozzle means including means defining a second triangular grouping of plural second openings in fluid communication with said second conduit means and second plural flange means rigidly associated with respective ones of said second openings to direct blown air onto said vehicle surface, said second flange means by virtue of said second triangular grouping of second openings for establishing a second generally V-shaped blown air curtain profile impinging upon said vehicle surface downstream of said first-mentioned V-shaped blown air curtain such that relative movement between said vehicle and said second blown air curtain profile along said travel direction responsively effects blown movement of water upon said surface rearwardly and laterally relative to said travel direction whereby said vehicle surface is substantially dried.

17. Vehicle drying installation as in claim 16 wherein predetermined ones of said first-mentioned flange means are angularly oriented towards one lateral side of said vehicle to cause a major component of said first-mentioned generally V-shaped blown air curtain to be directed towards said one vehicle side, and wherein predetermined ones of said second flange means are angularly oriented relative to another lateral side of said vehicle to cause a major component of said second generally V-shaped blown air curtain to be directed towards said other side.

18. A vehicle drying installation including at least one nozzle arrangement of the type including conduit means for defining a path through which blown air travels and blower means operatively connected to said conduit means at one end thereof for blowing air through said conduit means from said one end to a discharge end thereof, said nozzle arrangement comprising opening-defining means defining a triangular grouping of plural openings communicable with said discharge end of said conduit means to permit said blown air to pass therethrough, and plural flange means rigidly associated with respective ones of said openings to direct said blown air onto a surface of the vehicle, said flange means by virtue of said triangular grouping of openings for establishing a generally V-shaped blown air curtain profile for impingement upon said vehicle surface such that relative movement between said vehicle and said blown air curtain profile along a predetermined direction of travel responsively effects blown movement of water upon said surface rearwardly and laterally relative to said direction of travel, and air deflection means fixed to and dependently supported from a downstream portion, relative to said direction of travel, of predetermined ones of said flange means, said air deflection means for deflecting air discharged from said predetermined ones of said flange means in an upstream direction due to flexion of said flange means in response to reduced pressure being established along said upstream surface by air flowing thereagainst.

19. A vehicle drying installation including at least one nozzle arrangement of the type including conduit means for defining a path through which blown air travels and blower means operatively connected to said conduit means at one end thereof for blowing air through said conduit means from said one end to a discharge end thereof, said nozzle arrangement comprising opening-defining means defining a triangular grouping of plural openings communicable with said discharge end of said conduit means to permit said blown air to pass therethrough, and plural flange means rigidly associated with respective ones of said openings to direct said blown air onto a surface of the vehicle, said flange means by virtue of said triangular grouping of openings for establishing a generally V-shaped blown air curtain profile for impingement upon said vehicle surface such that relative movement between said vehicle and said blown air curtain profile along a predetermined direction of travel responsively effects blown movement of water upon said surface rearwardly and laterally relative to said direction of travel, and wherein said opening-defining means includes a truncated conically-shaped transition member having a top circular opening fixable to said discharge end of said conduit means and a bottom opening, plate means fixed to said bottom opening and defining at least three circular openings therein, said at least three circular openings establishing said triangular grouping, wherein the total area of said at least three circular openings is substantially equal to the area of said top opening.

20. A vehicle drying installation including at least one nozzle arrangement of the type including conduit means for defining a path through which blown air travels and blower means operatively connected to said conduit means at one end thereof for blowing air through said conduit means from said one end to a discharge end thereof, said nozzle arrangement comprising opening-defining means defining a triangular grouping of plural openings communicable with said discharge end of said conduit means to permit said blown air to pass therethrough, and plural flange means rigidly associated with respective ones of said openings to direct said blown air onto a surface of the vehicle, said flange means by virtue of said triangular grouping of openings for establishing a generally V-shaped blown air curtain profile for impingement upon said vehicle surface such that relative movement between said vehicle and said blown air curtain profile along a predetermined direction of travel responsively effects blown movement of water upon said surface rearwardly and laterally relative to said direction of travel, wherein said opening-defining means defines at least three openings disposed in said triangular group, and wherein said flange means of an upstream-most one of said at least three openings is sized and configured such that the remaining ones of said flange means of said at least three apertures are at least partially hidden by said flange means of said upstream-most one when viewed in said direction of travel.

21. A nozzle arrangement for a vehicle drying installation of the type including conduit means for defining a path through which blown air travels and blower means operatively connected to said conduit means at one end thereof for blowing air through said conduit means from said one end to a discharge end thereof, said nozzle arrangement including opening-defining means defining a triangular grouping of plural openings communicable with said discharge end of said conduit means to permit said blown air to pass therethrough, and plural flange means rigidly associated with respective ones of said openings to direct said blown air onto a surface of the vehicle, said flange means by virtue of said triangular grouping of openings for establishing a generally V-shaped blown air curtain profile for impingement upon said vehicle surface such that relative movement between said vehicle and said blown air curtain profile along a predetermined direction of travel responsively effects blown movement of water upon said surface rearwardly and laterally relative to said direction of travel and air deflection means fixed to and dependently supported from a downstream portion, relative to said direction of travel, of predetermined ones of said flange means, said air deflection means for deflecting air discharged from said predetermined ones of said skirt means in an upstream direction due to flexion of said skirt means in response to reduced pressure being established along said upstream surface by air flowing thereagainst.

* * * * *